US009851455B2

(12) United States Patent
Dolinsky et al.

(10) Patent No.: US 9,851,455 B2
(45) Date of Patent: Dec. 26, 2017

(54) SOLID STATE PHOTOMULTIPLIER WITH IMPROVED PULSE SHAPE READOUT

(71) Applicant: GENERAL ELECTRIC COMPANY, Schenectady, NY (US)

(72) Inventors: Sergei Ivanovich Dolinsky, Clifton Park, NY (US); Jianjun Guo, Ballston Spa, NY (US); David Leo McDaniel, Dousman, WI (US); Ravindra Mohan Manjeshwar, Glenville, NY (US); Geng Fu, Rexford, NY (US)

(73) Assignee: General Electric Company, Niskayuna, NY (US)

(*) Notice: Subject to any disclaimer, the term of this patent is extended or adjusted under 35 U.S.C. 154(b) by 277 days.

(21) Appl. No.: 14/688,008

(22) Filed: Apr. 16, 2015

(65) Prior Publication Data
US 2016/0308074 A1 Oct. 20, 2016

Related U.S. Application Data

(60) Provisional application No. 62/053,454, filed on Sep. 22, 2014.

(51) Int. Cl.
*G01T 1/24* (2006.01)
(52) U.S. Cl.
CPC .................... *G01T 1/247* (2013.01)
(58) Field of Classification Search
CPC ................ G01T 1/247; G01T 1/208
See application file for complete search history.

(56) References Cited

U.S. PATENT DOCUMENTS

| 2009/0290680 A1* | 11/2009 | Tumer ............ G01T 1/247 378/62 |
| 2010/0316184 A1 | 12/2010 | Iwanczyk et al. |
| 2011/0019047 A1 | 1/2011 | Suzuki et al. |
| 2011/0108702 A1 | 5/2011 | Jackson et al. |
| 2011/0210255 A1 | 9/2011 | Kim et al. |
| 2013/0327932 A1 | 12/2013 | Kim et al. |
| 2014/0048711 A1 | 2/2014 | Henseler et al. |
| 2014/0064446 A1 | 3/2014 | Wear et al. |
| 2014/0183339 A1 | 7/2014 | Dolinsky |

(Continued)

FOREIGN PATENT DOCUMENTS

| GB | 2487958 A | 8/2012 |
| WO | 9948282 A1 | 9/1999 |
| WO | 2013085923 A1 | 6/2013 |

OTHER PUBLICATIONS

Seifert et al., "A High Bandwidth Preamplifier for SiPM-Based TOF PET Scintillation Detectors", Nuclear Science Symposium Conference Record, 2008. NSS '08. IEEE, pp. 1616-1619, Oct. 19-25, 2008.

(Continued)

*Primary Examiner* — Tony Ko
(74) *Attorney, Agent, or Firm* — Pabitra K. Chakrabarti

(57) ABSTRACT

Embodiments of a solid state photomultiplier are provided herein. In some embodiments, a solid state photomultiplier may include a plurality of pixels, wherein each pixel of the plurality of pixels comprises a plurality of subpixels; and a first set of buffer amplifiers, wherein each buffer amplifier of the first set of buffer amplifiers is respectively coupled to a subpixel of the plurality of subpixels.

18 Claims, 5 Drawing Sheets

(56) References Cited

U.S. PATENT DOCUMENTS

2015/0055761 A1* 2/2015 Tredwell ................. G01T 1/247
378/207
2015/0288890 A1* 10/2015 Senda ...................... H04N 5/32
250/370.09

OTHER PUBLICATIONS

Liu et al., "Multiplexing Approaches for a 12×4 Array of Silicon Photomultipliers", Nuclear Science, IEEE Transactions, vol. 61, Issue 1, pp. 35-43, Feb. 2014.
PCT Search Report and Written Opinion issued in connection with corresponding Application No. PCT/US2015/045007 dated Nov. 2, 2015.

\* cited by examiner

SOLID STATE PHOTOMULTIPLIER WITH IMPROVED PULSE SHAPE READOUT

CROSS REFERENCE TO RELATED APPLICATION

This patent application claims the benefit of priority, under 35 U.S.C. §119, of U.S. Provisional Patent Application Ser. No. 62/053,454, filed Sep. 22, 2014, titled "SOLID STATE PHOTOMULTIPLIER WITH IMPROVED PULSE SHAPE READOUT" the entire disclosure of which is incorporated herein by reference.

BACKGROUND

Solid state photomultipliers (SSPMs), which are also commonly referred to as MicroPixel Photon Counters (MPPC) or MicroPixel Avalanche Photodiodes (MAPD) have become popular for use as photosensors. For example, SSPMs have been employed in scintillator based nuclear detectors. Typically, SSPMs are implemented as Silicon Photomultipliers (SiPM). The Silicon Photomultiplier (SiPM) is a multipixel array of avalanche photodiodes with a number up to a few thousand independent micropixels (with typical size of 10-100 microns) joined together on common substrate and working on common load. Each pixel detects the photoelectrons with a gain of about $10^6$.

Conventionally, the output of an SSPM pixel is connected to a front end buffer amplifier, which can be implemented as a transimpedance amplifier. Using this conventional arrangement can result in a readout pulse from the SSPM having a readout pulse shape that exhibits a fast rise time (e.g., <1 ns) and a relatively slow fall time (e.g., 10-50 ns). However, the inventors have observed that as the size of the SSPM increases, the readout pulse shape response degrades significantly due to increased parasitic capacitance and inductance in combination with intrinsic impedance of each SSPM pixel.

Thus, the inventors have provided an improved solid state photomultiplier.

BRIEF DESCRIPTION

Embodiments of a solid state photomultiplier are provided herein. In some embodiments, a solid state photomultiplier may include a plurality of pixels, wherein each pixel of the plurality of pixels comprises a plurality of subpixels; and a first set of buffer amplifiers, wherein each buffer amplifier of the first set of buffer amplifiers is respectively coupled to a subpixel of the plurality of subpixels.

In some embodiments, a silicon photomultiplier array may include a plurality of subpixels arranged in groups to form a pixel; a plurality of buffer amplifiers respectively coupled to the plurality of subpixels; and a plurality of secondary buffer amplifiers, wherein each group of subpixels is coupled to a secondary buffer amplifier of the plurality of secondary buffer amplifiers.

In some embodiments, a method for monitoring a solid state photomultiplier may include monitoring a parameter of a plurality of subpixels of a solid state photomultiplier, wherein the plurality of subpixels are arranged in groups to form a pixel, and wherein each subpixel has a buffer amplifier coupled thereto; determining whether a disablement of a subpixel of the plurality of subpixels or an adjustment of at least one of a $V_{bias}$ or gain of the buffer amplifier of the subpixel is needed; and providing a signal to the buffer amplifier to disable the subpixel or adjust at least one of the $V_{bias}$ or gain of the buffer amplifier.

The foregoing and other features of embodiments of the present invention will be further understood with reference to the drawings and detailed description.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Exemplary embodiments of the present invention are directed to improving functionality of a solid state photomultiplier (SSPM). In some embodiments, the inventive SSPM may include one or more buffer amplifiers at subpixel levels. Moreover, the buffer amplifiers may be multiplexed, thereby providing the above benefits without increasing a number of readout electronics or complexity of the system. In some embodiments, the buffer amplifiers may be monitored and/or adjusted to compensate for temperature and process nonuniformity or disabled to turn off failed or malfunctioning subpixels.

Figure 1:
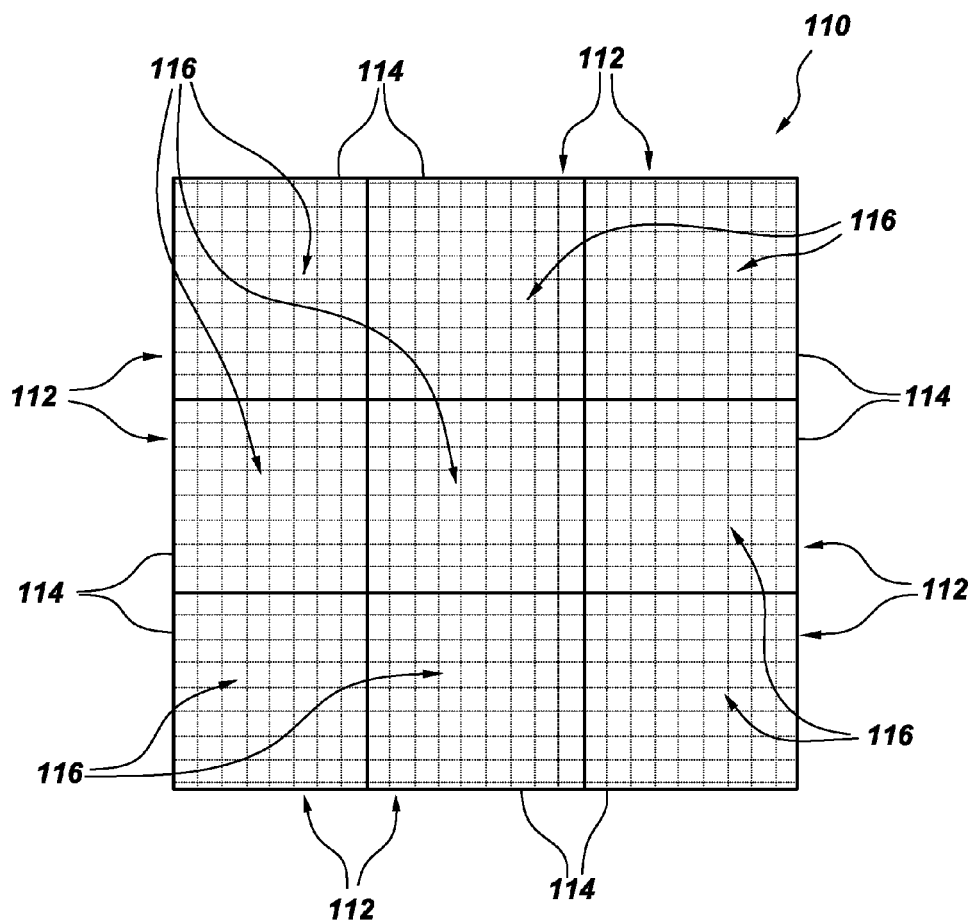
FIG. 1 illustrates a portion of an exemplary solid state photomultiplier (SSPM) array in accordance with some embodiments of the present invention.

FIG. 1 illustrates a portion of an exemplary SSPM array 110 (e.g., an SiPM) in accordance with some embodiments of the present invention. The array 110 can include pixel areas 112 and each pixel area 112 can include an SSPM (pixel 114). Each pixel 114 can be formed of an array of microcells 116. The microcells 116 that form the pixels 114 can be implemented as a two dimensional array having a specified dimension, e.g., from about 10 to about 100 microns, and a specified spatial density, e.g., about 100 to about 10,000/sq. mm. In some embodiments, the SSPM array 110 can be incorporated into a high energy detector, such as a scintillator-based detector or can be used for detecting single photons or any other light pulses (multiple photons).

Figure 2:
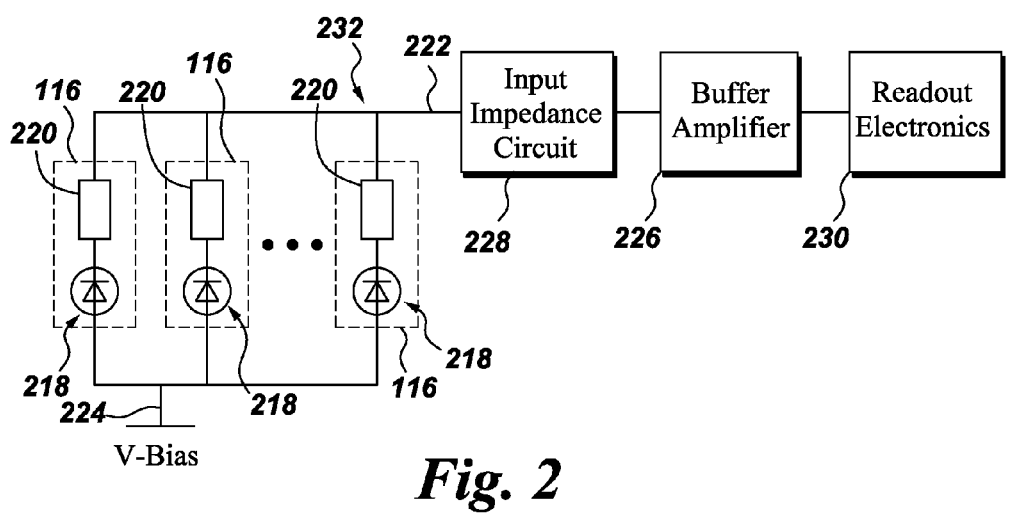
FIG. 2 illustrates a block diagram of an exemplary embodiment of an SSPM-based detector in accordance with some embodiments of the present invention.

FIG. 2 illustrates an exemplary embodiment of a detector including one or more of the pixels 114 of FIG. 1. The detector can be implemented in a nuclear detector (e.g., X-ray imaging system) and/or an optical detector (e.g., a light detector). Each microcell 116 of the pixel can be formed by an avalanche photodiode (APD) 218 operating in Geiger mode and a quenching element 220. In exemplary embodiments, the APDs 218 of the microcells 116 can be formed using one or more semiconductor materials, such as Silicon (Si), Silicon Carbide (SiC), Germanium (Ge), Indium Gallium Arsenide (InGaAs), Gallium nitride, Mercury Cadmium Telluride (HgCdTe), and/or any other suitable material(s). In one embodiment, the array of microcells 116 can be formed on a single semiconductor substrate to form the pixel 114.

Each APD 218 in the microcells 116 can have a breakdown voltage ($V_{br}$) of, for example, about 20 to about 2000 Volts and a bias voltage 224 can be applied to the microcells 116 to configure the APDs 218 in a reverse bias mode having an over voltage ($V_{ov}$) (i.e., the difference between the bias voltage $V_{bias}$ and the breakdown voltage $V_{br}$). The reverse biased APDs 218 can have an internal current gain of about 100 to about 1000 resulting from an avalanche effect within the APDs at bias voltage below breakdown. When they operate in Geiger mode, the gain of each microcell 116 is proportional to the over voltage and capacitance of microcell.

The quenching element 220 in each microcell 116 can be disposed in series between the bias voltage and the APD 218 or between the APD 218 and a common readout bus 232 and can operate to ensure that the APD 218 transitions to the quiescent state after a photon is detected. In exemplary embodiments, the quenching element can be a resistor, transistor, current controlled source, and/or any suitable device or devices for transitioning the APD 218 to the quiescent state after the APD 218 detects of a photon. The microcells 116 are connected to each other in parallel and share a common bias voltage and a common readout terminal. The output of each microcell 116 is used to generate an output 222 of the pixel 114, which can be processed by readout electronics 230.

The output of the microcells 116 can output from the pixel 114 and processed via a buffer amplifier 226. The output 222 of the pixel 114 can take the form of one or more electrical pulses ("readout pulses"). The readout pulses can have an associated discharge time for which a magnitude of the readout pulse increases and an associated recharge time for which the magnitude of the readout pulse decreases.

A rate at which the magnitude decreases during the recharge time (i.e., a recharge rate) can generally be determined by a capacitance associated with the APDs 218 of the SSPM and the impedance of the quenching elements 220. For example, when the quenching elements are resistors, the rate can be defined by the RC time constant formed by the capacitance of the APDs 218 and the resistance of the quenching resistors. In conventional readout configurations of SSPMs. the time constant can cause the recharge portion of the readout pulse to have a long tail (e.g., about 10-50 ns).

In some embodiments, a frequency dependent input impedance circuit 228 can be disposed between the output 222 of the pixel 114 and the input of the buffer amplifier 226 to provide a frequency dependent impedance. In some embodiments, the frequency dependent input impedance circuit 228 can be part of buffer amplifier 226. When present, the input impedance circuit 228 can be configured to shape the recharge portion of the readout pulse. For example, the input impedance circuit 228 can be used to control a voltage received at the input of the buffer amplifier 226 to minimize the amplification of the recharge portion of a readout pulse from the pixel 114.

As discussed above, the buffer amplifier 226 receives output from the pixel 114. In some embodiments, the buffer amplifier can be implemented as a transimpedance amplifier. The buffer amplifier can output the amplified signal to readout electronics 230 downstream of the buffer amplifier 226 for further processing by the readout electronics 230, which can include amplifiers, analog-to-digital converters, and/or any other suitable electronics.

In conventional SSPM/pixel 114 configurations, output of the microcells 116 can output from the pixel 114 to the buffer amplifier 226 in a single cumulative signal (e.g., such as described above with respect to FIGS. 1 and 2). However, the inventors have observed that, as the size of the pixel 114 increases, the resultant readout pulse provided to the readout electronics degrades. While not intending to be bound by theory, the inventors believe that such degradation may be caused by an increased parasitic capacitance and inductance in combination with an intrinsic impedance of each pixel 114 and associated packaging.

Figure 3:
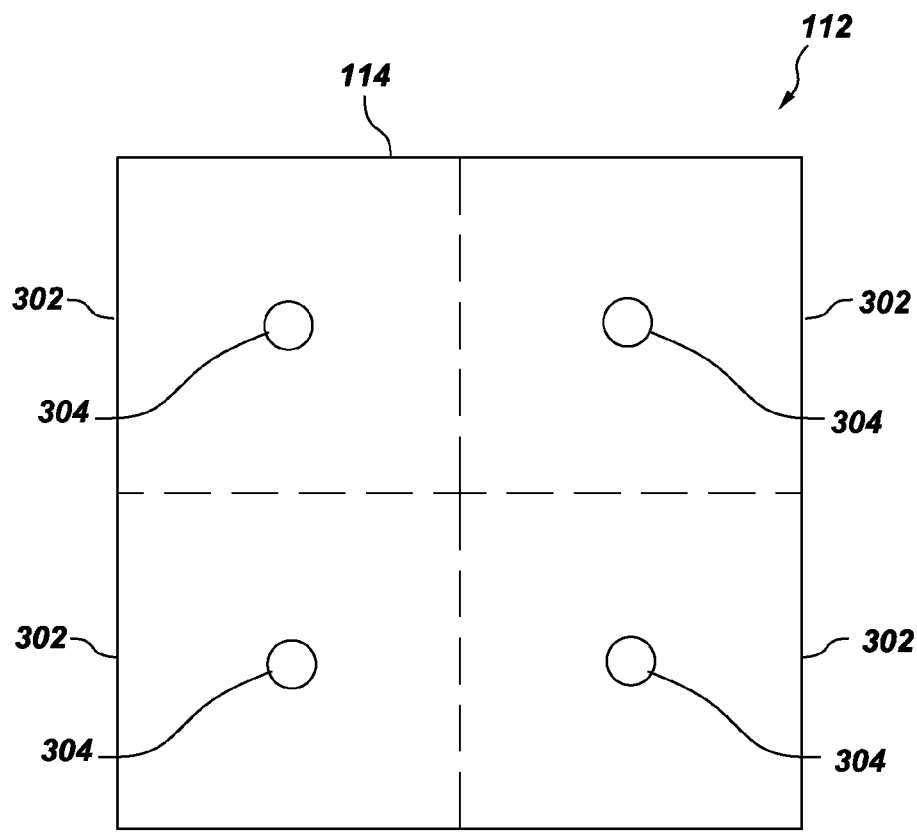
FIG. 3 illustrates a portion of an exemplary SSPM in accordance with some embodiments of the present invention.

As such, in some embodiments, each pixel 114 may be further divided into subpixels 302, wherein each subpixel 302 is coupled to a respective buffer amplifier 304, for example, such as shown in FIG. 3. As used herein, coupling of the subpixel 302 and buffer amplifier 304 may include any known coupling mechanism known in the art, for example a coupling via separate conductive element or integration of the buffer amplifier 304 into the subpixel 302 during the fabrication of the subpixel 302.

Figure 4:
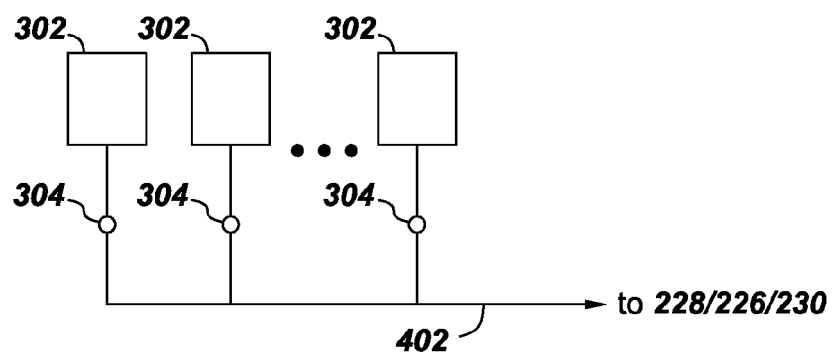
FIG. 4 illustrates a partial electrical schematic of the portion of the SSPM illustrated in FIG. 3.

The pixel 114 may be divided into any number of subpixels 302 suitable to facilitate the improved pulse shape response of the pixel 114. For example, referring to the partial view of a single pixel 114 in FIG. 3, in some embodiments, each pixel 114 may comprise four or more subpixels 302 each having a respective buffer amplifier 304 coupled thereto. Referring to FIG. 4, in such embodiments, the buffer amplifiers 304 may be coupled to one another in parallel and having a single output 402 to provide the processed signal to, for example, one or more other components of the array (e.g., the, readout electronics 230, impedance circuit 228, array level buffer amplifier 226, or the like). Coupling the buffer amplifiers 304 in such a manner allows for the inclusion of the buffer amplifiers 304 without having to increase a number of readout electronics channels and system complexity.

Figure 5:
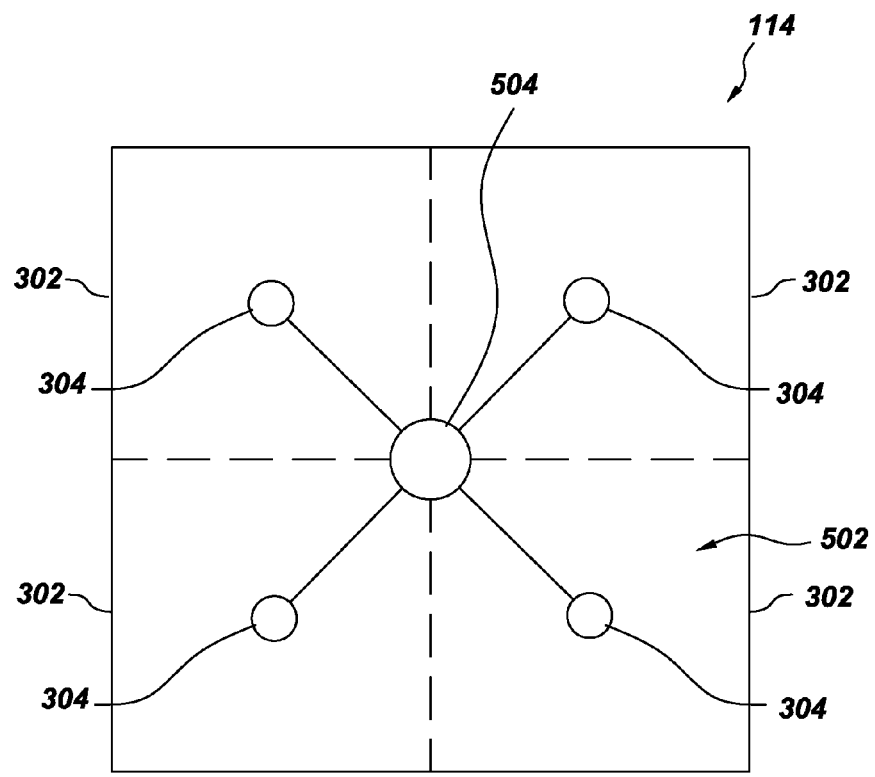
FIG. 5 illustrates a portion of an exemplary SSPM in accordance with some embodiments of the present invention.

In some embodiments, the buffer amplifiers may be multiplexed or grouped together via one or more secondary or tertiary buffer amplifiers. For example, referring to FIG. 5, in some embodiments, a group 502 of buffer amplifiers 304 may be coupled to a secondary buffer amplifier 504. The buffer amplifiers 304 may be grouped in any manner suitable to facilitate improving the readout pulse shape of the array.

For example, each group 502 of buffer amplifiers 304 may include buffer amplifiers 304 from one subpixel 302 or more than one subpixel 302.

Figure 6:
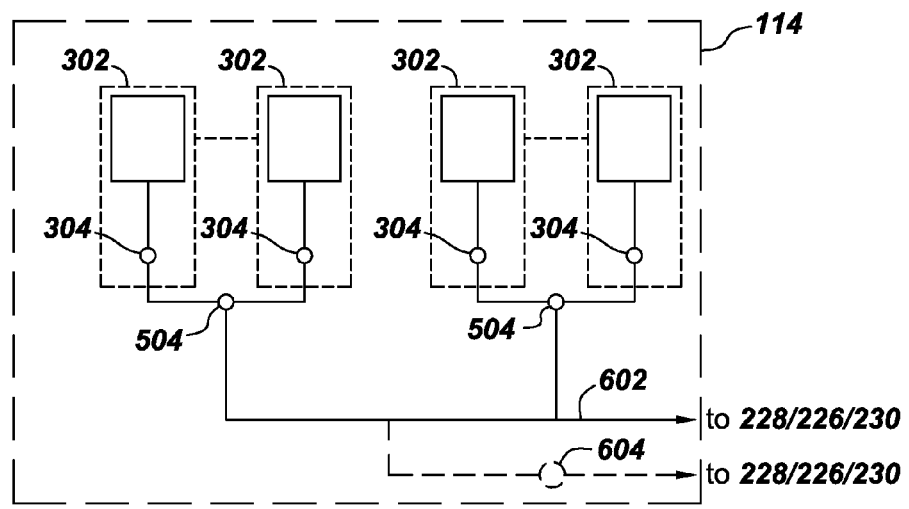
FIG. 6 illustrates a partial electrical schematic of the portion of the SSPM illustrated in FIG. 5.

Referring to FIG. 6, in some embodiments, the secondary buffer amplifiers 504 may be coupled to one another in parallel having a single output 602 to provide the processed signal to, for example, one or more other components of the array (e.g., the, readout electronics 230, impedance circuit 228, array level buffer amplifier 226, or the like).

Figure 7:
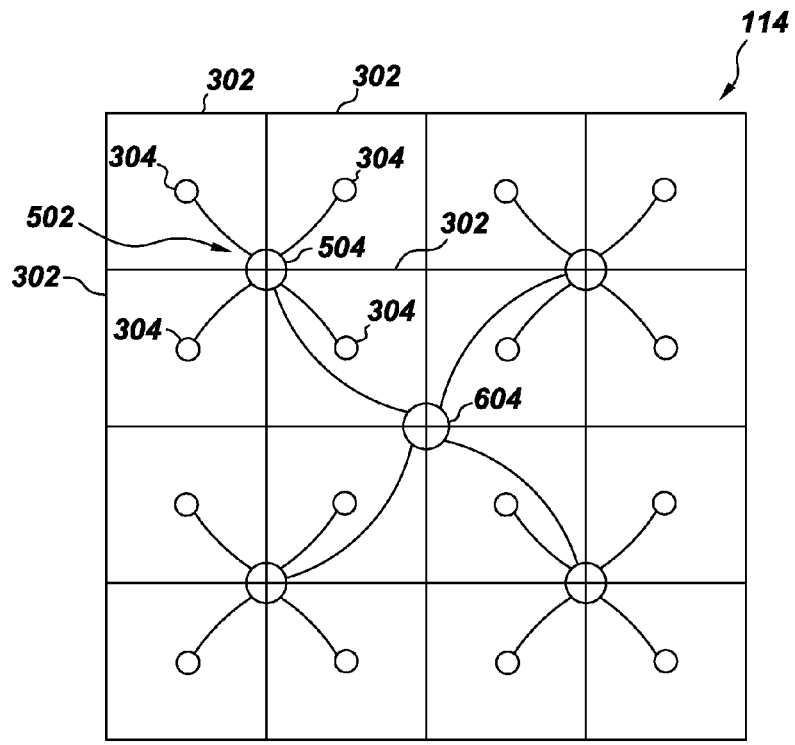
FIG. 7 illustrates a portion of an exemplary SSPM in accordance with some embodiments of the present invention.

Although, only two levels of buffer amplifiers (buffer amplifiers 304 and secondary buffer amplifiers 504) are shown in FIG. 6, it is to be understood that any number of levels may be utilized to facilitate improving the readout pulse shape of the array. For example, in some embodiments, the secondary buffer amplifiers 504 may be grouped in a manner similar to the buffer amplifiers 304 and coupled to a tertiary buffer amplifier (shown in phantom at 604) or tertiary set of buffer amplifiers. Referring to FIG. 7, in such embodiments, the buffer amplifiers (e.g., buffer amplifiers 304, secondary buffer amplifiers 504, tertiary buffer amplifiers 604, or the like) may be grouped in any manner suitable to facilitate improving the readout pulse shape of the array. For example, in some embodiments, each group 502 may comprise a plurality of buffer amplifiers 304 (e.g., more than 1, such as 2, 4 or the like) coupled to a secondary buffer amplifier 504, wherein a plurality of secondary buffer amplifiers 504 (e.g., more than 1, such as 2, 4 or the like) may be coupled to a tertiary buffer amplifier 604, such as shown in the figure.

In any of the above embodiments, the buffer amplifiers (e.g., buffer amplifiers 304, secondary buffer amplifiers 504 or tertiary buffer amplifiers 604) may be fabricated via any process known in the art. For example, in some embodiments the buffer amplifiers will be produced during one or of the semiconductor fabrication processes (e.g., CMOS, MOSFET, or the like) typically utilized to fabricate one or more components of the SSPM array. In such embodiments, the desired placement and coupling of each of the buffer amplifiers may be accomplished through various features formed in one or more layers of the structure. In addition, such fabrication techniques may facilitate the integration of the buffer amplifiers into the SSPM at subpixel, pixel or array level.

The inventors have observed that due to process and temperature variation, the gain of each of the buffer amplifiers (e.g., buffer amplifiers 304, 504, 604 described above) and/or the breakdown voltage ($V_{br}$) of the SSPM array 110 may vary, thereby introducing gain and signal response non-uniformities across the pixels and degradation of the pulse shape readout. As such, in some embodiments, one or more parameters of each of SSPM subpixel and the buffer amplifiers may be monitored and/or adjusted to provide a substantially uniform gain and signal response between SSPM subpixels and the buffer amplifiers.

For example, in some embodiments, a substantially uniform gain between the SSPM (e.g., pixel 114 described above)/SPAD (e.g., breakdown voltage ($V_{br}$)) and the buffer amplifiers may be desirable to facilitate an improved signal response uniformity. In such embodiments, gain adjustments may be facilitated either by varying anode voltages provided by the buffer amplifiers or direct adjustment of the gains of the buffer amplifiers. Such adjustments may be accomplished by any suitable mechanism known in the art. In some embodiments, the adjustments may be performed as a function of an integrated feedback loop (e.g., utilizing feedback circuitry) thus providing an automated system for providing uniformity between the SPPM and buffer amplifiers. In any of the above embodiments, after the gain for each buffer and sub pixel are calibrated, the gain may be maintained and local temperature changes may be monitored and compensated using components with a substantially similar temperature coefficient (TempCo) as $V_{br}$ in the feedback circuitry.

Figure 9:
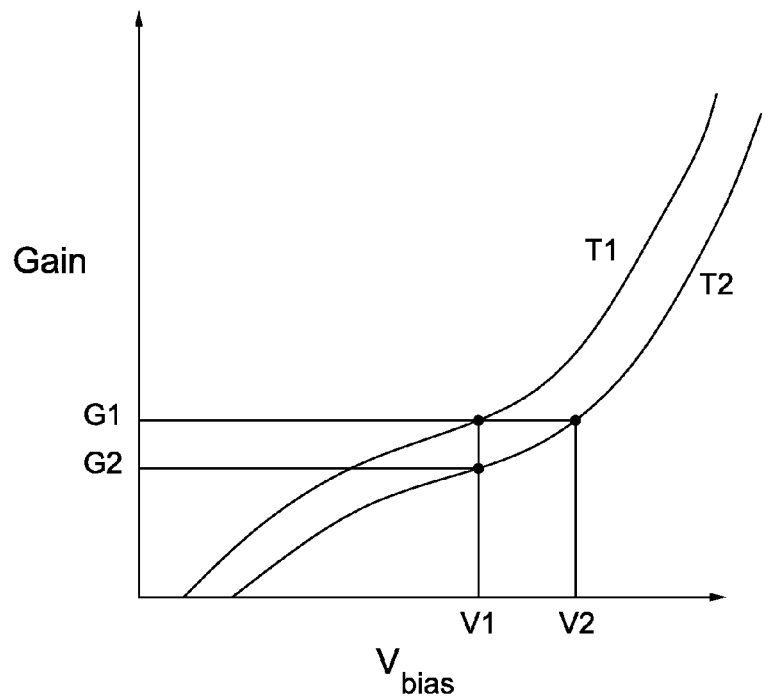
FIG. 9 is a graphical depiction of a first temperature curve (T1) and a second temperature curve (T2) of gain as a function $V_{bias}$.
Figure 10:
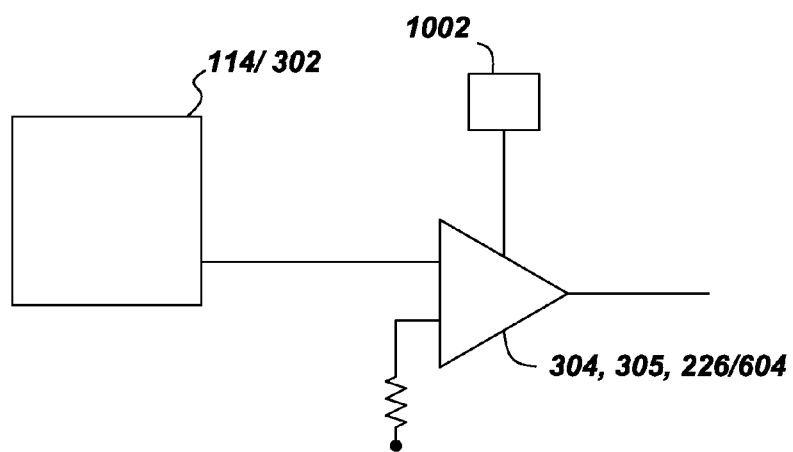
FIG. 10 illustrates an exemplary feedback loop for a portion of a SSPM in accordance with some embodiments of the present invention.

The inventors have further observed that variations in temperature of the pixel may cause a malfunction or degradation of the signal provided by the pixel. As such, in some embodiments, the $V_{bias}$ and/or gain may be adjusted to compensate for temperature changes of the subpixels. The temperature may be sensed via any mechanism suitable to accurately detect the temperature (e.g., sensor described below with respect to FIG. 10). Once the temperature information is extracted and converted to electrical signal, a feedback control circuit may automatically adjust the gain of the buffer amplifier to compensate the effects caused by the scintillator and $V_{br}$ variation due to temperature change. For example, referring to the graphical depiction of a first temperature curve (T1) and a second temperature curve (T2) of the gain as a function $V_{bias}$, as shown in FIG. 9, a shift from T1 to T2 may be facilitated, or compensated for, by adjusting the $V_{bias}$ (e.g., from V1 to V2) while maintaining a constant gain (e.g., G1) or adjusting the gain of amplifier (e.g., from G1 to G2) while maintaining a constant $V_{bias}$ (e.g., V1).

In some embodiments, the monitoring of the temperature and adjustment of the $V_{bias}$ and/or gain may be continuous, for example, such as part of a feedback loop. For example, referring to FIG. 10, in some embodiments, a temperature of the pixel 114 may be continuously monitored via a sensor 1002 which in turn provides feedback to the buffer amplifier 304 to facilitate adjustments in the gain or $V_{bias}$ of the buffer amplifier 304, for example, such as discussed above.

Figure 8:
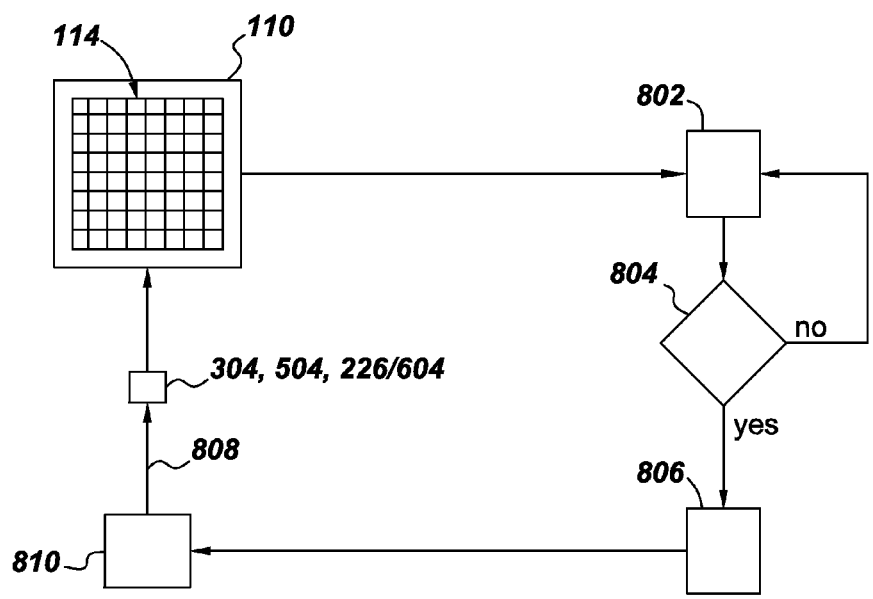
FIG. 8 is a flow diagram depicting an adjustment of a voltage and/or bias of a buffer amplifier in accordance with some aspects of the present invention.

Referring to the exemplary process flow for monitoring a SSPM 110 in FIG. 8, in some embodiments, one or more parameters of the pixel 114 or subpixel (e.g., subpixel 302 as described above) may be monitored (shown at 802). The one or more parameters may include any parameter indicative of operation of the SSPM, for example such as the parameters described above (e.g., temperature, $V_{bias}$, gain or the like). Next, at 804 a determination is made as to whether an adjustment of the $V_{bias}$ and/or gain of the pixel 114 is needed. If no such adjustment is needed the one or more parameters may be continuously monitored at 802. If an adjustment is needed, the magnitude of the adjustment is determined at 806 and provided to control circuitry 810. The control circuitry 810 then processes the information related to the adjustment and provides a signal 808 that is indicative of such an adjustment. Based on the signal 808, the gain or $V_{bias}$ of the buffer amplifier 304,504,226/604 is adjusted.

In some embodiments, the above described process flow may be continuous, for example, such as part of a feedback loop. Although shown as a separate component, it is to be understood that the control circuitry 810 may be integrated into the array at any level, for example, such as the pixel level, subpixel level, or the like.

Thus, an improved solid state photomultiplier has been provided herein. In at least some embodiments, the inventive SSPM may include one or more buffer amplifiers at subpixel levels that may advantageously improve the pulse shape readout of the SSPM as compared to conventionally configured SSPMs. In addition, in at least some embodiments, the buffer amplifiers may be monitored and/or adjusted to compensate for temperature and process nonuniformity.

Ranges disclosed herein are inclusive and combinable (e.g., ranges of "about 10-50 ns", is inclusive of the endpoints and all intermediate values of the ranges of "about 10-50 ns", etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

The invention claimed is:

1. A solid state photomultiplier, comprising:
    a plurality of pixels, wherein each pixel of the plurality of pixels comprises a plurality of subpixels;
    a first set of buffer amplifiers, wherein each buffer amplifier of the first set of buffer amplifiers is respectively coupled to a subpixel of the plurality of subpixels, wherein the first set of buffer amplifiers are multiplexed and configured to improve a readout pulse shape of the photomultiplier; and
    a control circuitry integrated into the photomultiplier and configured to: monitor a parameter of the plurality of subpixels, determine whether an adjustment of at least one of a Vbias or gain of at least one of the first set of buffer amplifiers is needed and provide a signal to the at least one of the first set of buffer amplifiers to adjust at least one of the Vbias or gain of the at least one of the first set of buffer amplifiers.

2. The solid state photomultiplier of claim 1, wherein the buffer amplifiers are integrally formed with the subpixels.

3. The solid state photomultiplier of claim 1, wherein each of the buffer amplifiers are coupled to one another in parallel to form a single output.

4. The solid state photomultiplier of claim 1, wherein the first set of buffer amplifiers comprise a plurality of groups of buffer amplifiers, wherein each group of buffer amplifiers are coupled to a respective secondary buffer amplifier of a plurality of secondary buffer amplifiers.

5. The solid state photomultiplier of claim 4, wherein the plurality of secondary buffer amplifiers are coupled to a tertiary buffer amplifier.

6. The solid state photomultiplier of claim 5, wherein the tertiary buffer amplifier is coupled to readout electronics.

7. The solid state photomultiplier of claim 4, wherein the plurality of secondary buffer amplifiers are coupled to readout electronics.

8. A silicon photomultiplier array, comprising:
    a plurality of subpixels arranged in groups to form a pixel;
    a plurality of buffer amplifiers respectively coupled to the plurality of subpixels;
    a plurality of secondary buffer amplifiers, wherein each group of subpixels is coupled to a secondary buffer amplifier of the plurality of secondary buffer amplifiers, wherein the plurality of buffer amplifiers and the plurality of secondary buffer amplifiers are multiplexed and configured to improve a readout pulse shape of the photomultiplier; and
    a control circuitry integrated into the array and configured to: monitor a parameter of the plurality of subpixels, determine whether an adjustment of at least one of a $V_{bias}$ or gain of at least one of the plurality of buffer amplifiers is needed and provide a signal to the at least one of the plurality of buffer amplifiers to adjust at least one of the $V_{bias}$ or gain of the at least one of the plurality of buffer amplifiers.

9. The silicon photomultiplier array of claim 8, wherein the buffer amplifiers are integrally formed with the subpixels.

10. The silicon photomultiplier array of claim 8, wherein each buffer amplifier of the plurality of buffer amplifiers are coupled to one another in parallel to form a single output.

11. The silicon photomultiplier array of claim 8, wherein the plurality of secondary buffer amplifiers are coupled to a tertiary buffer amplifier.

12. The silicon photomultiplier array of claim 8, wherein the plurality of secondary buffer amplifiers are coupled to readout electronics.

13. The silicon photomultiplier array of claim 8, wherein the tertiary buffer amplifier is coupled to readout electronics.

14. A method for monitoring a solid state photomultiplier, comprising:
    monitoring a parameter of a plurality of subpixels of a solid state photomultiplier, wherein the plurality of subpixels are arranged in groups to form a pixel, and wherein each subpixel has a buffer amplifier coupled thereto, and further wherein a plurality of the buffer amplifiers is multiplexed and configured to improve a readout pulse shape of the photomultiplier;
    determining whether an adjustment of at least one of a $V_{bias}$ or gain of the buffer amplifier of the subpixel is needed; and
    providing a signal to the buffer amplifier to adjust at least one of the $V_{bias}$ or gain of the buffer amplifier.

15. The method of claim 14, wherein the parameter comprises at least one of a temperature, $V_{bias}$ or gain of the subpixel.

16. The method of claim 14, wherein adjusting at least one of the $V_{bias}$ or gain of the buffer amplifier comprises adjusting the gain of the buffer amplifier such that the buffer amplifiers of the plurality of subpixels have a substantially uniform gain.

17. The method of claim 14, wherein adjusting at least one of the $V_{bias}$ or gain of the buffer amplifier comprises adjusting the $V_{bias}$ at the input of the buffer amplifier while maintaining the gain of the SPPM subpixel with buffer amplifier at a constant.

18. The method of claim 14, wherein adjusting at least one of the Vbias or gain of the buffer amplifier comprises adjusting the gain of the buffer amplifier while maintaining the Vbias at a constant.

* * * * *